United States Patent [19]
Bacchus et al.

[11] Patent Number: 5,440,383
[45] Date of Patent: Aug. 8, 1995

[54] PHASE DETECTION DEFLECTOMETER-TYPE OPTICAL DEVICE HAVING A LARGE MEASURING RANGE

[75] Inventors: Jean M. Bacchus, Saint-Priest-en-Jarez; Eric Durand, Saint-Heand, both of France

[73] Assignee: Essilor International (Compagnie General D'Optique), Creteil, France

[21] Appl. No.: 150,127

[22] PCT Filed: Mar. 31, 1993

[86] PCT No.: PCT/FR93/00323

§ 371 Date: Nov. 30, 1993

§ 102(e) Date: Nov. 30, 1993

[87] PCT Pub. No.: WO93/20416

PCT Pub. Date: Oct. 14, 1993

[30] Foreign Application Priority Data

Apr. 1, 1992 [FR] France ................ 92 03937

[51] Int. Cl.$^6$ ............................................. G01B 9/00
[52] U.S. Cl. .................................................... 356/124
[58] Field of Search ............... 356/124, 125, 126, 127, 356/371

[56] References Cited

U.S. PATENT DOCUMENTS

| | | | |
|---|---|---|---|
| 5,066,119 | 11/1991 | Bertrand | 356/124 |
| 5,066,120 | 11/1991 | Bertrand | 356/124 |
| 5,187,539 | 2/1993 | Adachi et al. | 356/124 |
| 5,225,890 | 7/1993 | Lee et al. | 356/371 |

FOREIGN PATENT DOCUMENTS 2647913 12/1990 France .

OTHER PUBLICATIONS

K. Omura et al., "Phase measuring Ronchi test", *Applied Optics*, Feb. 1, 1988, vol. 27, No. 3.
D. S. Wan et al., "Ronchi test and a new phase reduction algorithm", *Applied Optics*, Aug. 1, 1990, vol. 29, No. 22.
K. Patorski et al., "Fringe contrast interpretation for an extended source Ronchi test", Applied Optics, vol. 25, No. 16, Aug. 15, 1986.
G. Schulz et al., "Errors in phase-measurement interferometry with high numerical apertures", *Applied Optics*, Nov. 1, 1991, vol. 30, No. 31.

Primary Examiner—Richard A. Rosenberger
Assistant Examiner—Jason D. Eisenberg
Attorney, Agent, or Firm—Young & Thompson

[57] ABSTRACT

An optical device, of the deflectometer type, particularly with phase detection, comprises a light source, a surface to be tested, a semi-reflective surface between the light source and the surface to be tested to deflect the light beam reflected by the surface to be tested, a grating placed adjacent a focal region of the reflected light beam, and a CCD camera coupled to a data processor. Between the grating and the CCD camera there is a primary objective (19) with a large entry pupil supplying an intermediate image, a ground glass (20) adapted to receive this intermediate image, and a secondary optical system (21) through which the intermediate image passes which is formed on the ground glass (20) and which forms a final image on the a detector (6) of the CCD camera.

3 Claims, 3 Drawing Sheets

PHASE DETECTION DEFLECTOMETER-TYPE OPTICAL DEVICE HAVING A LARGE MEASURING RANGE

FIELD OF THE INVENTION

The invention relates to an optical device of the deflectometer-type, particularly for phase detection, with wide range of measurement.

BACKGROUND OF THE INVENTION

The high technologies employed nowadays in numerous optical and mechanical systems, often require surfaces produced with submicronic precision. In addition to mastering the machining processes, there is the problem of quality control of the obtained components.

U.S. Pat. No. 5,066,119 describes an optical device, adapted for the control, by phase detection, of any surface of an optical system, comprising essentially, along an optical path: emission means adapted to constitute a light source, a reflecting surface to be tested, a separator cube disposed between the light source and the surface to be tested and provided with a semi-reflecting surface to divert the light beam reflected by the surface to be tested, a grating such as a Ronchi grating, disposed adjacent the point of convergence of said reflected light beam, an objective to give the image observable in the analysis plane of a camera with a charge coupled device (CCD), which is to say in the plane of the CCD detector, and a camera coupled to data processing means for use of the image by phase detection.

This optical device, of the deflectometer type, with phase detection, permits precise and rapid measurement, for any surface, and without contact, of a large variety of optical and aspherical surfaces, without specific tools. It has however, by virtue of its principle, limits in terms of the diameter of the measurable range, particularly because of the entrance pupil of its acquisition system.

SUMMARY OF THE INVENTION

An object of the invention is to increase the entry pupil of an imaging system, particularly a deflectometer, so as to increase its measurable field.

Another object of the invention is to use a zoom for observation of the image given by a deflectometer.

The invention has for its object an optical device, of the deflectometer type, particularly for phase detection, comprising a luminous source, a surface to be tested, a semi-reflective surface between the light source and the surface to be tested to deflect the light beam reflected by the surface to be tested, a grating placed adjacent the point of convergence of said reflected light beam, and a CCD camera coupled to data processing means, characterized in that it comprises, between the grating and the CCD camera, a primary objective with a large entry pupil supplying an intermediate image, a ground glass adapted to receive said intermediate image, and a secondary optical system through which the intermediate image on the ground glass passes and which forms a final image on the detector of the CCD camera.

According to another characteristic of the invention, the secondary optical system is a zoom.

BRIEF DESCRIPTION OF THE DRAWINGS

Other characteristics will appear from the description which follows with reference to the accompanying drawings, in which can be seen.

DETAILED DESCRIPTION OF THE INVENTION

Figure 1:
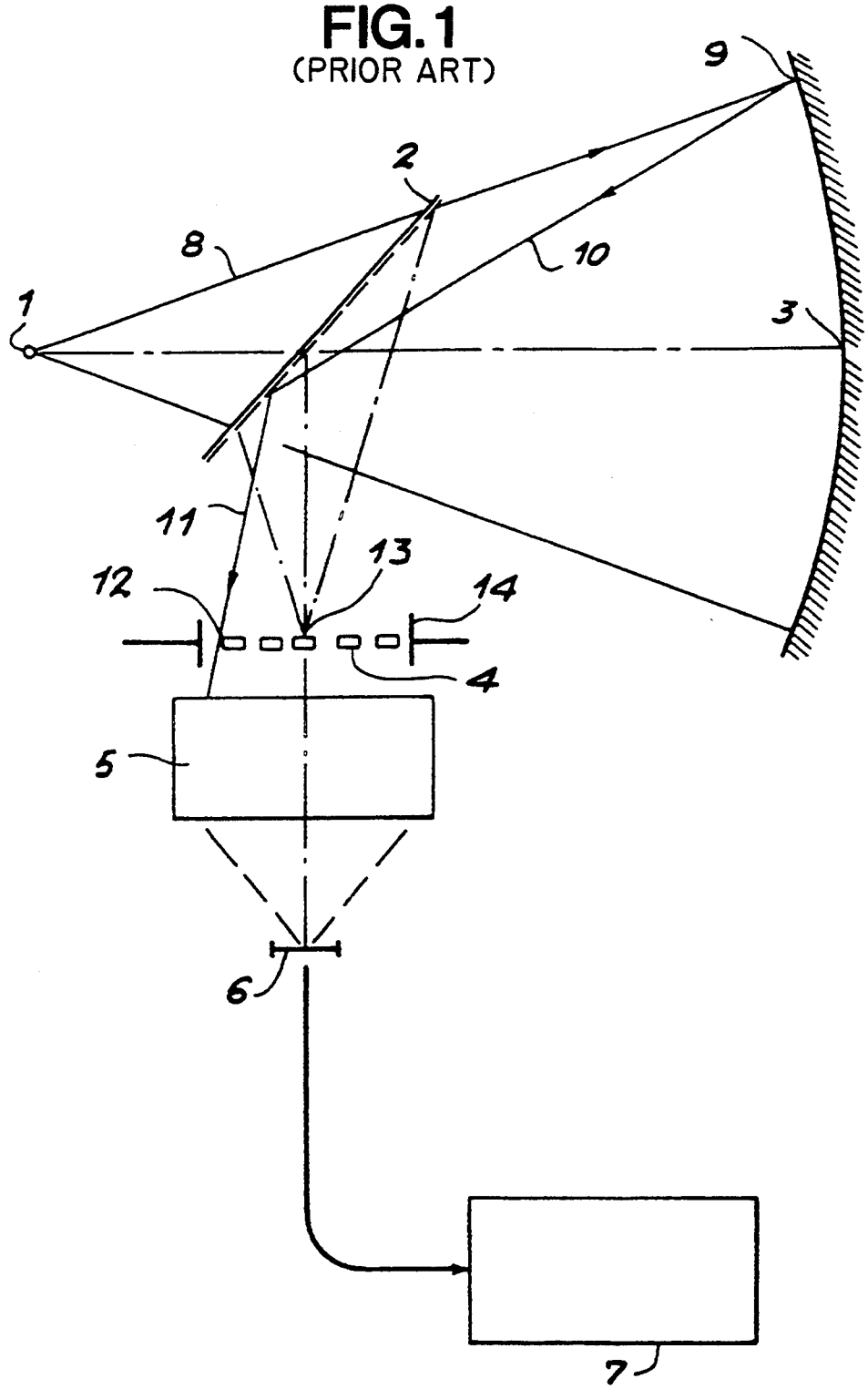
FIG. 1: a schematic view of an optical device of known type, with a grating and separator element, for the testing, by phase detection, of an optical surface.

In FIG. 1 can be seen light source 1, a semi-reflective surface 2, the optical surface 3 to be tested, a Ronchi grating 4, an objective 5, a detector 6 of a CCD camera (not shown), and data processing means 7.

The optical surface 3 being aspherical, a beam 8 from the source 1 reaches surface 3 at point 9, and is reflected at 10. The beam 10 is deflected at 11 by a semi-reflective surface 2, and it reaches the grating 4 at a point 12 spaced a distance d from point 13 symmetrical with the source 1 relative to the semi-reflective surface 2.

The distance d between the points 12 and 13 is the deflection to which the light beam from the source 1 is subjected, after reflection from the surface 3 to be tested. For each point 9 on the surface 3, the knowledge of the deflection d and of the angle at which the point 9 is viewed from the source 1, permits determining the slope of this point, and reconstituting the surface 3 by integration.

It is then possible to subtract by calculation the theoretical surface from the actual surface and therefore to provide a map of the defects of the surface 3.

A detailed description of the optical device with grating and separator element for the testing by phase detection of an optical system, is given in the above U.S. patent, to which reference is made, and which forms a portion of the present description.

In such a device (FIG. 1), the objective 5 has the function of forming on the detector 6 of the CCD camera, the image of the observed surface, on which is superposed the fringe pattern to be analyzed. Illumination of a point on the surface is characteristic of the slope of the surface at this point.

Moreover, the observed surface 3 must be disposed, relative to the objective, such that any point 9 returns to the interior of the entry pupil symbolized at 14 of the objective 5, the beam from the source 1 which it has deflected.

If this is not the case, the point in question, emitting no light toward the camera, cannot be measured. The principal limit of the measurable field for a device of the type of a "deflectometer with phase detection" is therefore that all the beams from the source 1 must, after reflection from the surface 3, reach the detector 6 of the acquisition camera, or in other words enter into the entrance pupil 14 of the system for formation of the images (objective+camera).

Figure 2:
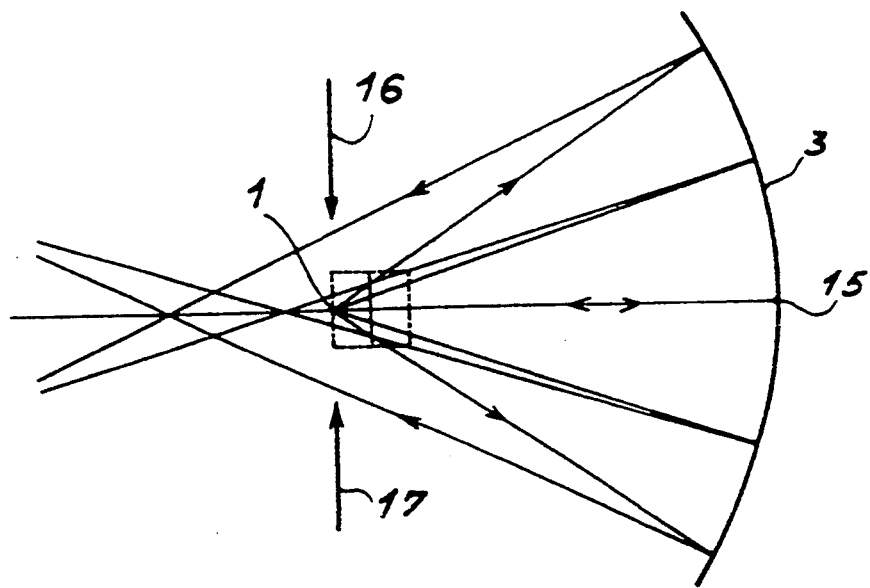
FIG. 2: a schematic view of the rays emitted by the light source and reflected by an aspherical optical surface.
Figure 3:
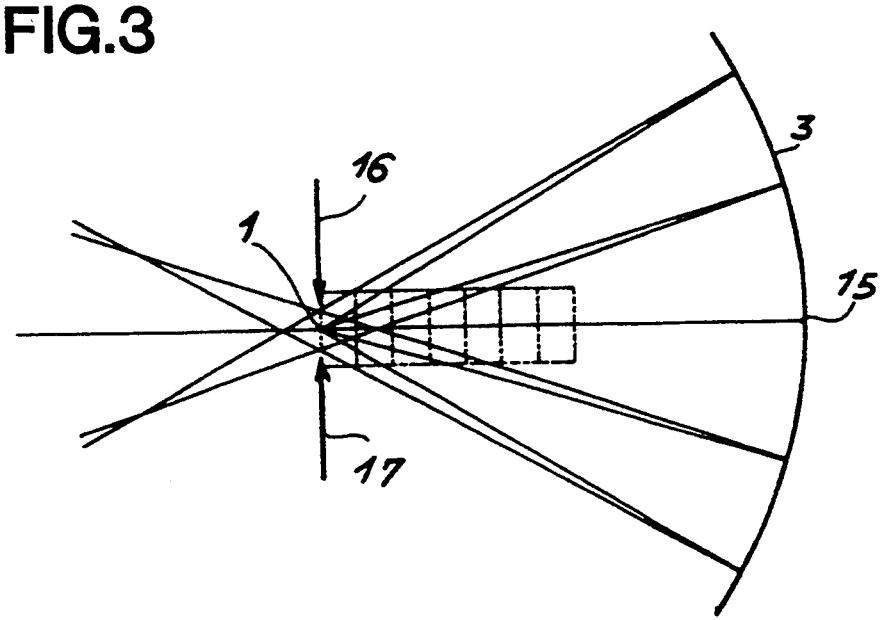
FIG. 3: schematic view illustrating the defocalization relative to the schematic view of FIG. 2.

In FIG. 2, the source 1 illuminates the surface 3 which is aspherical, whose axis passes through the points 1 and 15. In the plane perpendicular to this axis and containing the source 1, the diameter of the light beam reflected by the surface 3 is not zero. This diameter is symbolized by the arrows 16 and 17. Moreover, it is possible to cause this diameter to vary, and to render it as small as possible by displacing the source 1 relative to the surface 3 (FIG. 3).

This operation, currently used for pupillary imagery, is called defocalization. It permits positioning any aspherical surface relative to the source so as to minimize the diameter of the return beam in the plane of the source. One thus speaks of "circle of least diffusion" (CLD) in the plane of the source.

A surface 3 will be measurable (pupillary imagery), if its CLD (if desired after passing through an adapter optical system) is smaller in size than the entry pupil of the acquisition system.

The interest of the user is to have a system having the largest entry pupil possible, if it is desired to measure a surface without specific equipment for compensation of asphericity.

To increase this pupil size, one can:
—increase the relative aperture (F/D) of the objective, but it is difficult and very costly to design and produce objectives corrected for aberrations with large apertures.
—increase its focal length, but this increases proportionally the size of the image In practice, this means that the size of the entry pupil is directly proportional to the size of the image formed.

The most common CCD cameras operate with detectors whose image height is less than or equal to 6.6 mm. This image size already permits measuring a very wide range of aspherical surfaces, particularly used in optics. On the other hand, for surfaces with deformations such that the CMD will be greater than this limit, one must be limited as to measurable diameter.

Finally, the concepts of pupil size (in addition to the requirement for a forward pupil), have until that point prevented the use of zoom optical systems (difficulties of design and production).

Figure 4:
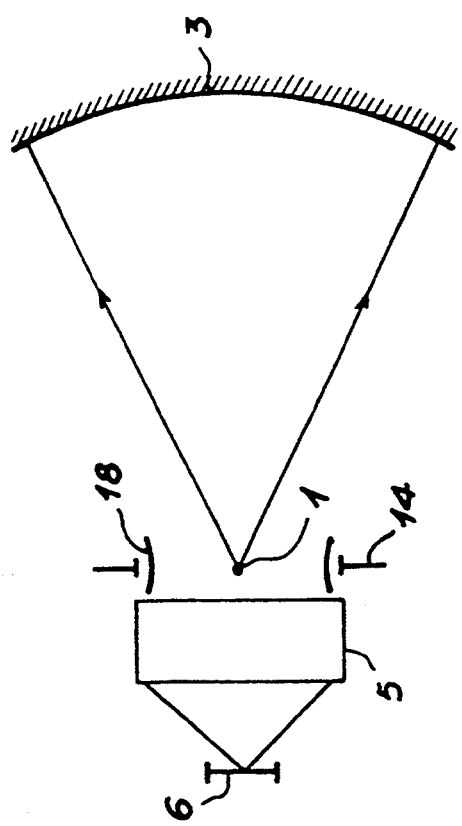
FIG. 4: a schematic view of the principle of the optical device of FIG. 1.

In FIG. 4, the entry pupil 14 and the circle of least diffusion 18 are shown. The detector 6, which defines the size of the image, is of small dimensions. The entry pupil 14 is of maximum size, and the aperture is large on the image side.

Figure 5:
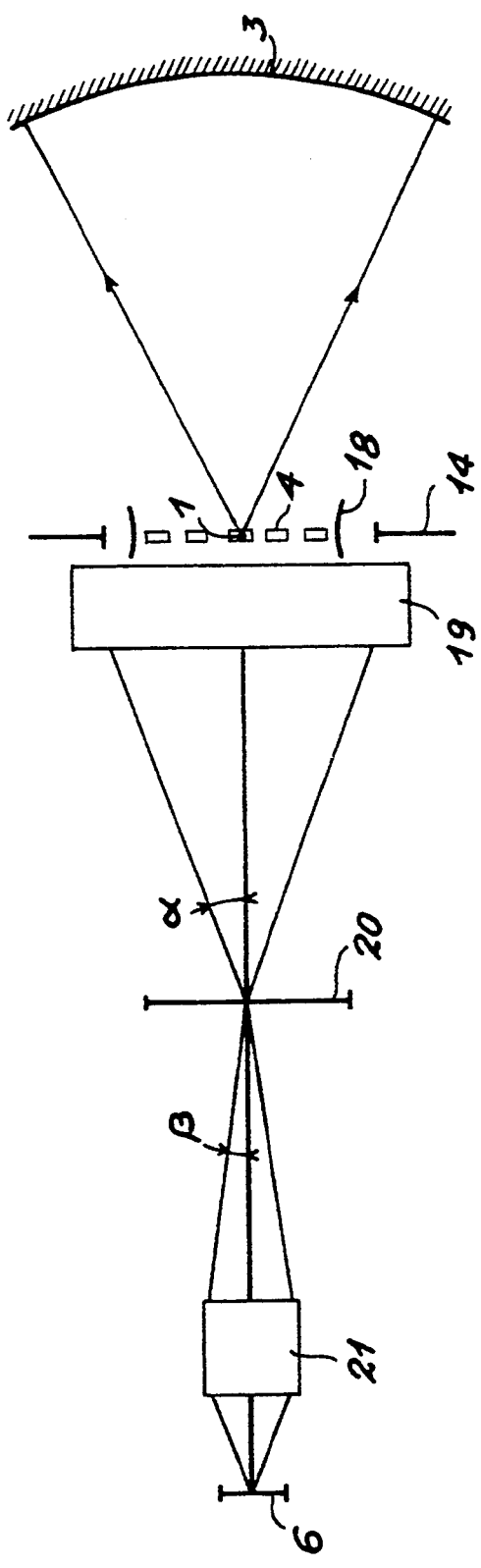
FIG. 5: a schematic view of the principle of the optical device according to the invention.

To avoid the constraints of the existing devices, the optical device according to the invention is schematically shown in FIG. 5. In this FIG. 5, the source 1 emits a beam toward the surface 3 to be tested which is aspherical. The beam deflected by the surface 3, after defocalization, has a circle of least diffusion (CLD) 18. The primary objective 19 has a large entry pupil 14, but it has an aperture that is relatively limited by the possibilities and cost of production, and as a result, it gives a large image. This image is focussed in the image plane of the primary objective 19, for example on a ground glass 20 of small thickness.

This image passes through an optical system 21 for secondary imaging which forms from it an image on the detector 6 of the CCD camera.

The use of a ground glass 20 between the primary objective 19 and the secondary optical system 21 permits forming the secondary image with the secondary optical system 21 at an aperture angle $\beta$ smaller than the image aperture angle $\alpha$ of the primary objective 19. The secondary objective is thus no longer subjected to the proportional relation which exists in conventional deflectometers, between the size of the entry pupil and that of the image on the detector of the CCD camera. Because of this, the size of the intermediate image can be very large, and the entry pupil of the primary objective 19, which is to say in fact the entry pupil of the optical acquisition system, can be greatly increased.

As a result, the measurable range, in terms of slope and asphericity, of the optical device according to the invention, will be increased relative to conventional deflectometers.

In an optical device according to the invention, the secondary optical system 21 can be a zoom optical system, because its aperture is independent of that of the primary objective.

The optical device according to the invention is applicable to systems for measuring surfaces by deflectometry. It comprises essentially a primary objective with a large entry pupil forming an intermediate image focussed in a plane, for example with a ground glass, and a secondary optical system to pass the intermediate image, such that the size of the final image will be compatible with any CCD camera detector.

The ground glass can be replaced by any type of diffuser, which is to say an optical member which, when it is illuminated by a light ray, reemits the light in a cone having a certain aperture (diffusion indicatrix).

We claim:

1. In an optical device, of the deflectometer type, particularly with phase detection, comprising a light source, a surface to be tested, a semi-reflective surface between the light source and the surface to be tested to deflect light reflected by the surface to be tested, a grating placed adjacent a focal region of said reflected light, and a CCD camera coupled to data processing means; the improvement which comprises, between the grating and the CCD camera, a primary objective (19) with a large entry pupil supplying an intermediate image, a ground glass (20) adapted to receive said intermediate image, and a secondary optical system (21) through which the intermediate image passes which is formed on the ground glass (20) and which forms a final image on a detector (6) of the CCD camera.

2. Optical device according to claim 1, wherein the secondary optical system is a zoom optical system.

3. Optical device according to claim 1, wherein said surface to be tested is an aspherical concave surface of revolution having an optical axis on which said grating lies.

* * * * *